March 13, 1962  C. HELWIG  3,025,113
DRIVE SHAFT BEARING AND SEAL
Filed Aug. 4, 1960
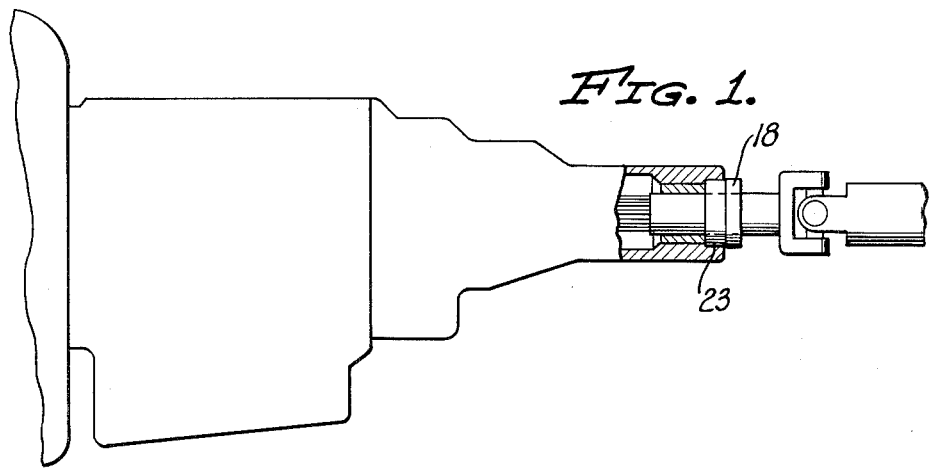
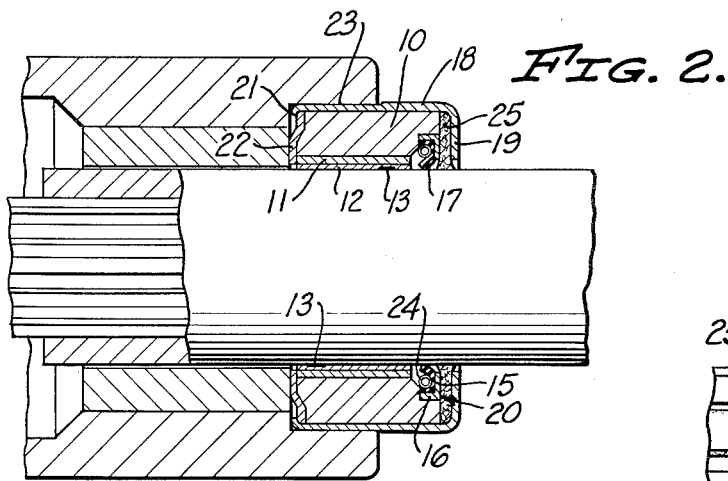
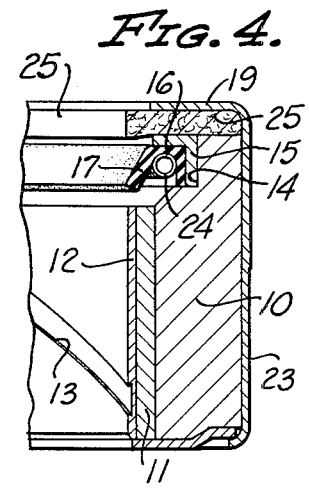
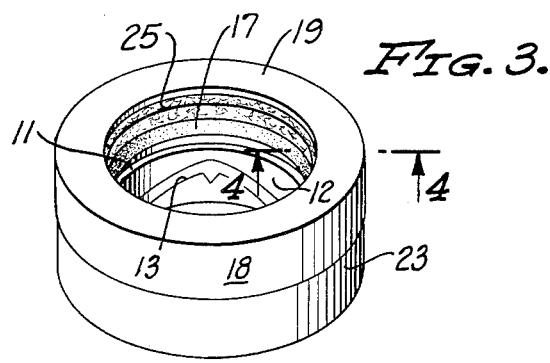
INVENTOR.
CARL HELWIG
BY
ATTORNEY 3,025,113
DRIVE SHAFT BEARING AND SEAL
Carl Helwig, 2601 San Fernando Road,
Los Angeles, Calif.
Filed Aug. 4, 1960, Ser. No. 47,403
2 Claims. (Cl. 308—36.1)

This invention relates to a combined bearing and seal for the drive shafts of automotive vehicles.

The drive shafts of automotive vehicles are conventionally mounted in a babbitt bearing. In use, this bearing becomes worn and permits looseness to develop between the drive shaft and the bearing. Such looseness or play results in damage to the oil seal which in turn permits the transmission fluid to leak, resulting in damage to the rear end portion of the vehicle.

It is an object of my invention to overcome this by providing a combined bearing and seal in which the bearing portion is much tougher than babbitt and cannot be damaged, deformed or become worn in use. My device is adapted to be installed on the vehicle and used without requiring the removal of the original babbitt bearing. My bearing is so constructed that when installed it is perfectly aligned with the babbitt bearing and the spline shaft of the vehicle.

It is a further object of my invention to provide such a bearing which incorporates a self-aligning seal. Because the bearing prevents the shaft from going out of alignment, the seal is protected from damage and the installation of my device assures proper operation of the drive shaft assembly.

Another object of my invention is to provide such a device which is self-lubricating, with both the bearing and the seal being properly lubricated from the transmission of the vehicle.

It is also among the objects of my invention to provide a drive shaft bearing and seal having all of the benefits and advantages of the structure set forth above and described hereinafter.

My invention also comprises such other objects, advantages and capabilities as will later more fully appear and which are inherently possessed by my invention.

While I have shown in the accompanying drawings a preferred embodiment of my invention, it should be understood that the same is susceptible of modificaiton and change without departing from the spirit of my invention.

Referring to the drawings, FIG. 1 is a side elevational view of the drive shaft portion of an automotive vehicle showing my bearing and seal in use, with the transmission extension housing broken away and shown in section;

FIG. 2 is an enlarged longitudinal sectional view of my bearing and seal in use;

FIG. 3 is a perspective view of my bearing and seal;

FIG. 4 is a sectional view of one side of my bearing and seal.

A preferred embodiment which has been selected to illustrate my invention comprises a combined drive shaft bearing and seal having a tublar body 10 formed of solid hardened steel. A steel sleeve 11 is tightly fitted within the hollow interior of the body 10 and has a welded bronze inner portion 12 to provide a thin tough bearing surface which will not lose its shape during bearing engagement with the drive shaft of the vehicle. Excessive friction between the drive shaft and the inner portion 12 of the sleeve 11 is prevented by a lubricating groove 13 which carries oil from the transmission to lubricate the inner portion 12. The lubricating groove 13 which is shown in the drawings has an S-pattern.

The body 10 is provided with a counterbore 14 which extends inwardly from one end thereof. Mounted within the counterbore 14 is a self-aligning oil seal 20. The seal 20 comprises an annular metal backing plate 15 having an L-shaped cross section, with one side thereof fitting against the side of the counterbore 14 and the other side thereof extending across the end of the counterbore 14. An annulus 16, which is formed of rubber, neoprene or other rubber-like material is bonded within the backing plate 15. The annulus 16 has an integral resilient annular flange 17 which protrudes radially inwardly beyond the inner diameter of the inner portion 12 of the sleeve 11. A tightly wound circular coil spring 24 fits within the rubber 16 and urges the flange 17 radially inwardly so as to maintain it in engagement with the drive shaft of the vehicle when my bearing and seal is in use.

A wide flat felt ring 25 fits against the end of the body 10 which carries the oil seal 20. The ring 25 overlies the end of the body 10 and the end of the oil seal 20. A hardened steel cover 18 fits around the body 10 and has at one end thereof a wide flange 19 which overlies the felt ring 25 and holds the ring 25 and oil seal 20 in place. The other end of the cover 18 is bent over at 21 to hold a metal ring 22 which fits over the opposite end of the body 10 and sleeve 11.

After my device is completely assembled in the manner described, it is placed on a collet lathe and the end remote from the oil seal 20 which is to be press fitted into the transmission extension housing is cut away to form a diametrically reduced inner end 23. The purpose of this reduction is two-fold. First, it prevents any possible error on the part of the user in installing the device backwards, since only the diametrically reduced inner end 23 of the finished device has an outside diameter sufficiently small to fit into the housing. Second, and more important, it makes the outside diameter of the inner end 23 perfectly concentric with the inner diameter of the inner portion 12 of the sleeve 11, thus assuring perfect alignment between the bearing surface of the sleeve 11 and the babbitt bearing and spline shaft of the vehicle in which it is installed.

In use, it is not necessary to remove the transmission or the original babbitt bearing in order to install my combined bearing and seal. The two U-bolts are first removed from the rear universal joint. The drive shaft is dropped and the entire drive shaft assembly slid out of the transmission. The conventional real oil seal which protrudes from the rear of the transmission is knocked out and replaced with my bearing and seal. Because of the reduced diameter of the inner end 23 of my device, it is impossible to insert the wrong end into the transmission extension housing. The drive shaft is then replaced and the rear universal joint reconnected. The time required for this entire operation is approximately fifteen minutes.

In use, the bronze inner portion 12 provides a thin tough bearing surface which will not lose its shape. The lubricating groove 13 provides lubrication for the bearing and also for the oil seal 20. The oil seal 20 is self-aligning due to the resilience of the flange 17 and the spring 24. The precision bearing portion of my device is in perfect alignment with the vehicle and maintains the drive shaft in perfect alignment at all times. The built-in oil seal 20 prevents any leakage of transmission fluid through the bearing.

I claim:

1. A unitary combined drive shaft bearing and seal for use in the transmission of a power plant comprising a tubular body portion formed of solid hardened steel, a thinner tubular steel sleeve fitted within said body portion, said sleeve having a bronze inner portion, said body portion having a counterbore at one end thereof, a self-aligning oil seal mounted within said counterbore, said oil seal comprising an annular metal backing plate having an L-shaped cross section with one side thereof disposed against the side of said counterbore and the other side thereof extending across the end of said counterbore, a resilient annulus within said backing plate, said annulus having an integral annular flange protruding radially inwardly beyond the inner portion of said sleeve, a circular coil spring fitted within said annulus, said coil spring engaging and urging said flange radially inwardly, the inner portion of said sleeve having an S-pattern lubricating groove, a felt ring overlying one end of said body portion and said backing plate, a hardened steel cover fitted around said body portion, said cover having an integral flange at one end thereof overlying said felt ring, a flat annular metal ring overlying the opposite end of said body portion, said cover being bent over at its other end to overlie said ring, the outer wall of the end of said cover remote from said oil seal being diametrically reduced and being concentric with the inner portion of said sleeve.

2. A unitary combined drive shaft bearing and seal for use in the transmission of a power plant comprising a tubular body portion formed of hardened metal, a thinner tubular sleeve fitted within said body portion, said body portion having a counterbore at one end thereof, a self-aligning oil seal mounted within said counterbore, said oil seal comprising an annular metal backing plate having an L-shaped cross section with one side thereof disposed against the side of said counterbore and the other side thereof extending across the end of said counterbore, a resilient annulus within said backing plate, said annulus having a flange protruding radially inwardly beyond the inner diameter of said sleeve, a circular coil spring fitted within said annulus, said coil spring engaging and urging said flange radially inwardly, the inner portion of said sleeve having an S-pattern lubricating groove, a felt ring overlying one end of said body portion and said backing plate, a hardened metal cover fitted around said body portion, said cover having a flange at one end thereof overlying said felt ring, a flat annular metal ring overlying the opposite end of said body portion, said cover being bent over at its other end to overlie said ring, the outer wall of said cover remote from said oil seal being diametrically reduced and being concentric with the inner portion of said sleeve.

References Cited in the file of this patent

UNITED STATES PATENTS

| | | |
|---|---|---|
| 867,823 | Hicks | Oct. 8, 1907 |
| 1,569,751 | Higgins | Jan. 12, 1926 |
| 2,189,686 | Stevenson | Feb. 6, 1940 |
| 2,405,120 | Evans | Aug. 6, 1946 |
| 2,817,977 | Holt | Dec. 31, 1957 |
| 2,857,213 | Meier | Oct. 21, 1958 |
| 2,867,457 | Riesing et al. | Jan. 6, 1959 |

FOREIGN PATENTS

| | | |
|---|---|---|
| 256,632 | Switzerland | Mar. 1, 1949 |